United States Patent [19]

Huebner

[11] Patent Number: 5,485,808
[45] Date of Patent: Jan. 23, 1996

[54] SYNTHETIC SEA WATER SOLUTION KIT AND METHOD OF MANUFACTURE

[76] Inventor: David A. Huebner, 724-9th Ave. S., South St. Paul, Minn. 55075

[21] Appl. No.: 22,993

[22] Filed: Feb. 26, 1993

[51] Int. Cl.$^6$ ................................................ A01K 63/04
[52] U.S. Cl. ................................................................ 119/231
[58] Field of Search .......................... 119/3, 2; 252/408.1; 47/59

[56] References Cited

U.S. PATENT DOCUMENTS 3,585,967  6/1971  Kelley .
3,623,455  11/1971  Kelley .
3,886,904  6/1975  King .

Primary Examiner—Gene Mancene
Assistant Examiner—Thomas Price
Attorney, Agent, or Firm—Thomas B. Tate

[57] ABSTRACT

A concentrated, synthetic, sea water solution; which upon dilution with fresh water produces a high purity, synthetic sea water and a method for making the same. The liquid mixture is composed of two, separate and equal volume, portions; each portion containing a percentage of specific major and minor ions. The solution may also contain essential trace elements. The solution is extremely pure; being specifically treated to remove harmful, non-essential, heavy metals.

2 Claims, No Drawings

SYNTHETIC SEA WATER SOLUTION KIT AND METHOD OF MANUFACTURE

BACKGROUND—FIELD OF INVENTION

This invention relates to the production and composition of an artificial sea water solution, specifically to a concentrated, high purity solution.

BACKGROUND—DESCRIPTION OF PRIOR ART

Efforts to create an artificial solution of sea water for the maintenance of marine life are recorded as early as 1854 by Gosse. However natural sea water is a complex mixture of organic and inorganic compounds and only recently have attempts to formulate suitable substitutes proved successful.

Gosse and others of the period used only the four major salts naturally occurring in sea water to formulate their mixtures and met with only limited success. They rightly surmised something was missing and so began inoculating their mixtures with seaweed or some living organism. This improved the environment, however their success in maintaining organisms for long periods of time was still limited.

There were two primary reasons for the shortcomings of these initial attempts; a failure to understand the complexity of natural sea water and a lack of knowledge of the physiology of marine fish and invertebrates.

As chemical test instruments and test methods have become increasingly sensitive, it has become apparent, natural sea water most likely contains every naturally occurring element present on earth. In water, these elements are dissolved and lose or gain electrons to form ions. Some elements join together to from complex ions. Of all the ions in sea water, six are considered major. They are essential to life for the marine organism. Five additional ions are termed minor ions. They occur at lower concentrations than the six major ions and their importance to marine organisms is less well understood. The balance of the elements found in natural sea water are termed as trace elements and only fourteen of them are considered to be essential. (See Table 1., Inorganic Composition of Sea Water). The remaining elements are considered at this time to be nonessential. It is also well known that an excess of any element or ion can prove fatal to the marine organisms involved, whether captive or in a natural state.

Most modern, commercial mixtures for sea salts utilize this now well documented relationship of major and minor elements in natural sea water. Some manufacturers of synthetic sea salts also add additional trace elements to their formulations. When properly mixed and as long as overall water quality is maintained, they are quite capable of sustaining marine life for perhaps as long as those organisms would normally live in their native environment. Problems arise when these salts are not properly utilized or when the water quality is allowed to deteriorate to a point at which the organisms are poisoned.

Obviously no manufacturer of sea salt mixtures can be responsible for the way the consumer uses the product. The manufacturer must make the product as easy to use as possible and provide clear, easy to follow instructions. The formulation of the sea salt must also be as pure as possible and all elements balanced as closely as possible with regard to naturally occurring sea water. This optimum formulation is more forgiving for the major and minor elements and more critical for the trace elements including those that are essential. The reason being is at optimum pH, most of the trace elements are chelated by various anions in the solution (sulfates, phosphates, carbonates, hydroxides, etc.) and are not capable of causing distress to the organisms in the system. However, should the pH drop and the water become more acidic, these elements are released and are free to interfere with the organism's metabolism. This is an extremely dangerous condition and should be avoided.

Since the pH in a closed system always tends to lower over time, the sea salt mixture should not contain an excess of trace elements. This is not easily guaranteed because, in its natural state, sodium chloride, the major constituent in sea water, contains many trace elements. The number of trace elements and amounts thereof vary greatly dependent from where the sodium chloride was mined. Using sodium chloride in its natural condition (rock salt) to formulate a synthetic sea salt mixture would most likely be toxic to the marine organisms it was designed to sustain. Since it is not economically practical to use a highly purified or reagent grade of salt, most commercial formulations rely on a technical grade of sodium chloride as well as the other salts which compose sea water. The most pure of these salts typically contain a minimum of five parts per million total metallic impurities. Depending on the impurities present, (copper, lead, arsenic, mercury, iron) this amount can be enough to poison the organisms present should the pH be allowed to drop to unacceptable levels.

Dry, commercially available salts are also cumbersome to use. A mixing container separate from the aquarium must be used. The salts dissolve slowly, require much stirring and then must be allowed to settle, preferably over night before addition to the system.

Presently available salts also tend to form insoluble precipitates during storage and upon mixing. U.S. Pat. Nos. 3,623,455 (1971), 3,886,904 (1973) and 3,585,967 (1971) all discuss and suggest various solutions to eliminate such problems. In U.S. Pat. Nos. 3,623,455 and 3,585,967 to Kelley et al., the inventors propose rising salts with carefully controlled moisture contents, but then admit the formulation will still form a slight precipitate when dissolved. In U.S. Pat. No. 3,886,904 to King and in U.S. Pat. No. 3,585,967 to Kelly, a two part mixture is utilized. One part is a blend of dry salts, the second part is a liquid containing dissolved trace elements. This solves the problem of trace element solubility, but does nothing to eliminate the properties of the dry salts to absorb moisture and form insoluble precipitates.

Furthermore, none of the available commercial salts, nor any previously patented mixtures or blends of salts, solve the most inconvenient property of all such products. All the chemical salts used to Formulate these mixtures are hygroscopic (water attracting) to varying degrees. (Calcium chloride is so hygroscopic it has been used to dehumidify damp air.) Therefore once the package containing these salt blends has been opened, it is extremely difficult to reseal it tight enough to prevent the mixture from absorbing water and hardening. Even in unopened packages the salt mixtures tend to solidify in time.

OBJECTS AND ADVANTAGES

Accordingly, several objects and advantages of the present invention are:

(a) to provide a sea salt concentrate which will yield a synthetic sea water solution capable of sustaining any and all types of marine organisms for an indefinite period of time;

(b) to provide a sea salt concentrate which does not contain an excess of any element, particularly those elements which are neither major or minor elements, but which are considered trace elements;

(c) to provide a sea salt concentrate which is easily mixed;

(d) to provide a sea salt concentrate which is not hygroscopic and will not harden upon aging;

(e) to provide a sea salt concentrate which does not form insoluble precipitates;

(f) to provide a sea salt concentrate which, after mixing, is not required to age for any period of time before addition to the marine environment (aquarium); and (g) to provide a sea salt concentrate which in small volumes, can be added directly to the aquarium.

Further objects and advantages are to provide an economical sea salt concentrate which is easy and convenient to use and store and which, when properly mixed, will not contain any metallic elements in high enough concentrations to adversely affect the health of the marine environment should the pH of the system be allowed to drop.

TABLE FIGURES

In the figures, tables are labeled individually.

TABLE 1 shows average the inorganic composition of sea water by major and minor ions, and trace elements.

TABLE 2 shows the composition of the invention in concentrate and dilute form.

TABLE 3 shows a list of metal ions precipitated by sulfide and a table of metallic sulfide solubility.

TABLE 4 shows a table of make-up and formulae of make-up.

DESCRIPTION

A typical embodiment of my synthetic sea water solution is as shown in TABLE 2. The solution concentrate is composed of two equal, liquid portions; Pan A and Part B. The concentrated solution is a ten times concentrate. This is readily seen by comparing the amounts of major and minor ions listed in TABLE 1.

The advantages gained by utilizing a concentrated, two-part mixture are considerable. The salts that would normally form insoluble precipitates are now separated. The amount of time the product can be stored, its shelf-life, is virtually unlimited. Also, since the salts have already been dissolved in water, mixing is quick and simple. Aging after mixing is eliminated and no precipitates will be formed provided the simple mixing directions are followed. Further, a ten-times concentrate saves volume in transport and storage.

Another major advantage for utilizing a liquid concentrate can best be illustrated by TABLE 3; a List of Metal Ions Precipitated by Sulfide, and TABLE 3, Solubility Product Constants of Some Metallic Sulfides. As can be seen, most of the heavy metallic ions are precipitated by sulfide. Referring to Table 3, note the extremely small solubility product constants for some of the more common metallic sulfides. The smaller the solubility product, the less soluble (more insoluble) the sulfide of the corresponding metal. For example: mercury (II) sulfide has a solubility product of $2.0 \times 10^{-53}$ whereas the solubility product of copper (I) sulfide is $2.26 \times 10^{-48}$. This means that mercurous sulfide is approximately one hundred thousand times less soluble than cuprous sulfide. The most important aspect of the solubility of the metallic sulfides for this discussion, is the fact they are all extremely insoluble. A solubility of $1 \times 10^{-9}$ means only 1 gram of material can dissolve in one billion liters of water.

Since all of the commonly used salts in the manufacture of sea water mixtures contain metallic impurities, a method by which the resulting mixture can be easily purified is highly desirable. By dissolving the major salts in their proper proportions and treating the resultant solution with a source of sulfur, such as hydrogen sulfide gas, virtually all heavy metal contaminants will be precipitated. These precipitates are then filtered out and the excess hydrogen sulfide is driven off. The liquid concentrates, Part A and Part B, now contain only the desired major and minor elements. At this point, the correct amounts of the essential trace elements are returned to the mixture.

This method of purification produces a sea water mixture which will not release harmful amounts of trace elements should the pH of the aqua-culture environment be allowed to drop.

OPERATION

The manner of using my synthetic sea water concentrate, while simple, differs considerably from that of the mixtures presently available.

The first step is to determine what volume of sea water is required and remove it from the system. The amount of Part A and Part B together, will be equal to one tenth of this volume. For example, a marine aquarium of 4000 liters needs a 10% water change. Therefore, the amount of fresh sea water required is 400 liters. Of this 400 liters, 40 liters will consist of my synthetic sea water concentrate. The 40 liters of concentrate will be divided equally between Parts A and B, 20 liters of each.

After the 400 liters has been removed from the system, 20 liters of Part A are accurately measured and added to an adequately sized mixing vessel. Next, 360 liters (90% of the 400 required) of fresh water (preferably deionized or distilled) is added. The remaining 20 liters of Part B are added last. The mixture may be stirred if desired, although the agitation resulting from pouring the solutions together and pumping or pouring the final solution into the aquarium is usually sufficient.

Additions to an existing system of 10% of total volume or less, can be made directly to the aquarium if desired. Also, the make-up of the total volume of sea water for a new system can be accomplished directly in the aquarium. TABLE 4, Table of Make-Up, shows several examples as well as a general formula for calculating the correct amounts of Pans A, B and distilled water, to make up any required amount of sea water.

SUMMARY, RAMIFICATIONS, SCOPE

Accordingly, the reader can see the synthetic, sea water concentrate of this invention can be used to quickly and conveniently produce a salt water solution which contains the proper amounts of all major and minor elements as well as the necessary trace elements without containing potentially hazardous amounts of any heavy metal impurities. In addition, this invention eliminates several problems which are common to previous inventions of synthetic sea salt mixtures in that it provides a method to make additions of up to 10% directly to the marine environment;

it prohibits the formation of insoluble precipitates upon mixing;

it provides a solution which requires no aging period before its addition to the system;

it provides a sea salt concentrate which will not harden in the container during storage;

it provides a salt water concentrate which, in the case of a new environment, can be used to make up, directly in the aquarium, tank, etc., a synthetic sea water, immediately before the addition of the marine organisms.

Although the description contains many specifics, these should not be construed as limiting the scope of this invention, but rather as merely providing examples of some of the preferred embodiments of this invention. For example: the liquid concentrates, Parts A and B, could be blended as six or eight times concentrates; different salts could be used as sources for the various elements; the division of salts and/or elements could vary between Parts A and B; a different source of sulfur from hydrogen sulfide could be used to precipitate the heavy metals in the preparation of the concentrate; the number of parts of the concentrated mixture could be increased to three, etc.

Thus the scope of the invention should be determined by the appended claims and their legal equivalents, rather than the examples given.

TABLE 1

INORGANIC COMPOSITION OF SEA WATER[1]

| Component | Concentration (mg/l) |
|---|---|
| MAJOR IONS | |
| Chloride | 19,000 |
| Sodium | 10,500 |
| Sulfate | 2,600 |
| Magnesium | 1,350 |
| Calcium | 400 |
| Potassium | 380 |
| MINOR IONS | |
| Bicarbonate | 142 |
| Bromide | 65 |
| Borate | 25 |
| Strontium | 8 |
| Silicate | 8 |
| TRACE ELEMENTS | |
| Aluminum | 0.01 |
| Arsenic | 0.003 |
| Barium | 0.03 |
| Cadmium | 0.0001 |
| Cesium | 0.0003 |
| Chromium[2] | 0.00005 |
| Cobalt[2] | 0.0004 |
| Copper[2] | 0.003 |
| Fluorine[2] | 1.2 |
| Iodine[2] | 0.06 |
| Iron[2] | 0.01 |
| Lead | 0.00003 |
| Lithium | 0.17 |
| Manganese[2] | 0.002 |
| Mercury | 0.0002 |
| Molybdenum[2] | 0.01 |
| Nickel[2] | 0.007 |
| Phosphorous[2] | 0.07 |
| Rubidium | 0.12 |
| Selenium[2] | 0.0001 |
| Tin[2] | 0.001 |
| Thorium | 0.000001 |
| Titanium | 0.001 |
| Uranium | 0.003 |
| Vanadium[2] | 0.002 |
| Zinc[2] | 0.01 |
| Total of all others | Less than 0.10 |

TABLE 1-continued

INORGANIC COMPOSITION OF SEA WATER[1]

| Component | Concentration (mg/l) |
|---|---|

[1]Typical analysis, composition may vary by location.
[2]Considered to be an essential trace element.
References:
S. Spotte, Captive Seawater Fishes: Science and Technology, John Wiley & Sons, Inc., New York, 1992, ISBN 0-471-54554-6.
E. Mowka, The SeaWater Manual, Aquarium Systems, Ohio, 1981.

TABLE 2

Major and Minor Ions

| Ion | Part A (mg/l) | Part B (mg/l) | Total (mg/l) |
|---|---|---|---|
| COMPOSITION OF CONCENTRATE[1] | | | |
| Chloride | 89,200 | 99,800 | 189,000 |
| Sodium | 52,600 | 52,100 | 104,700 |
| Sulfate | 25,350 | | 25,350 |
| Magnesium | 9,450 | 3,000 | 12,450 |
| Calcium | | 4,000 | 4,000 |
| Potassium | 50 | 3,950 | 4,000 |
| Bicarbonate | 1,450 | | 1,450 |
| Bromide | | 600 | 600 |
| Borate | 250 | | 250 |
| Strontium | | 100 | 100 |
| Silicate | 80 | | 80 |
| COMPOSITON OF DILUTED CONCENTRATE | | | |
| Chloride | 8,920 | 9,980 | 18,900 |
| Sodium | 5,260 | 5,210 | 10,470 |
| Sulfate | 2,535 | | 2,535 |
| Magnesium | 945 | 300 | 1,245 |
| Calcium | | 400 | 400 |
| Potassium | 5 | 395 | 400 |
| Bicarbonate | 145 | | 145 |
| Bromide | | 60 | 60 |
| Borate | 25 | | 25 |
| Strontium | | 10 | 10 |
| Silicate | 8 | | 8 |

[1]Typical analysis, composition may vary slighty from batch to batch.

TABLE 3

LIST OF METAL IONS PRECIPITATED BY SULFIDE AT pH 7

| | |
|---|---|
| $Ag^{+1}$ | $Os^{+4}$ |
| $As^{+3}$ | $Pb^{+2}$ |
| $Au^{+3}$ | $Pd^{+2}$ |
| $Bi^{+3}$ | $Pt^{+2}$ |
| $Cd^{+2}$ | $Re^{+4}$ |
| $Co^{+2}$ | $Rh^{+2}$ |
| $Cr^{+3}$ | $Ru^{+4}$ |
| $Fe^{+2}$ | $Sb^{+3}$ |
| $Ge^{+2}$ | $Se^{+2}$ |
| $Hg^{+2}$ | $Sn^{+2}$ |
| $In^{+3}$ | $Te^{+4}$ |
| $Ir^{+4}$ | $Tl^{+1}$ |
| $Mn^{+2}$ | $V^{+4}$ |
| $Mo^{+3}$ | $Zn^{+2}$ |
| $Ni^{+2}$ | |

SOLUBILITY PRODUCT CONSTANTS OF SOME METALLIC SULFIDES

| | | |
|---|---|---|
| Bismuth Sulfide | $Bi_2S_3$ | $1.82 \times 10^{-99}$ |
| Cadmium Sulfide | CdS | $1.40 \times 10^{-29}$ |
| Copper(I) Sulfide | $Cu_2S$ | $2.26 \times 10^{-48}$ |
| Copper(II) Sulfide | CuS | $1.27 \times 10^{-36}$ |
| Iron(II) Sulfide | FeS | $1.59 \times 10^{-19}$ |
| Lead Sulfide | PbS | $9.04 \times 10^{-29}$ |
| Manganese(II) Sulfide | MnS | $4.65 \times 10^{-14}$ |

TABLE 3-continued

| | | |
|---|---|---|
| Mercury(II) Sulfide | HgS | $2.00 \times 10^{-53}$ |
| Nickel(II) Sulfide | NiS | $1.07 \times 10^{-21}$ |
| Palladium(II) Sulfide | PdS | $2.03 \times 10^{-58}$ |
| Platinum(II) Sulfide | PtS | $9.91 \times 10^{-74}$ |
| Silver(I)(alpha form) Sulfide | Ag$_2$S | $6.69 \times 10^{-50}$ |
| Tin(II) Sulfide | SnS | $3.25 \times 10^{-28}$ |
| Zinc Sulfide | ZnS | $2.93 \times 10^{-25}$ |

Reference:
J. Snyder, Jr., Editor, Handbook of Chemistry and Physics, 71st Ed., CRC Press, Boston, 1990.

TABLE 4

TABLE OF MAKE-UP

| Amount of Sea Water Liters required | Amount of Part A Liters to use | Amount of Part B Liters to use | Amount of Distilled Water to use (liters) |
|---|---|---|---|
| 10 | 0.5 | 0.5 | 9 |
| 20 | 1.0 | 1.0 | 18 |
| 50 | 2.5 | 2.5 | 45 |
| 100 | 5 | 5 | 90 |
| 200 | 10 | 10 | 180 |
| 500 | 25 | 25 | 450 |
| 1000 | 50 | 50 | 900 |

FORMULAE OF MAKE-UP

1. SW\20 = A
2. A = B
3. DW = (A + B) × 9

SW = amount of sea water required in liters
A = amount of concentrate Part A in liters
B = amount of concentrate Part B in liters
DW = amount of distilled water in liters

I claim:

1. A synthetic sea water kit comprising a first container containing a first concentrated aqueous solution of dissolved inorganic salts (Part A) and a second container containing a second concentrated aqueous solution of dissolved inorganic salts (Part B), wherein said Part A optimally contains approximately 89,200 milligrams per liter chloride ion, 52,600 milligrams per liter sodium ion, 25,350 milligrams per liter sulfate ion, 9,450 milligrams per liter magnesium ion, 50 milligrams per liter potassium ion, 1,450 milligrams per liter bicarbonate ion, 250 milligrams per liter borate ion, and 80 milligrams per liter silicate ion, and said Part B optimally contains approximately 99,800 milligrams per liter chloride ion, 52,100 milligrams per liter sodium ion, 3,000 milligrams per liter magnesium ion, 4,000 milligrams per liter calcium ion, 3,950 milligrams per liter potassium ion, 600 milligrams per liter bromide ion, and 100 milligrams per liter strontium ion.

2. The method of using said kit of claim 1 to make a synthetic sea water solution, said method comprising the following steps:

pouring said Part A into a mixing vessel, diluting said Part A with an appropriate amount of distilled water, then pouring said Part B into said mixing vessel to produce a concentrated synthetic sea water solution;

wherein the amounts of said Part A, said distilled water, sand said Part B to be used in making said synthetic sea water solution are determined by the following formulae: SW/20=A, A=B, and DW=(A+B)×9, wherein SW equals the amount in liters of synthetic sea water to be made, A equals the amount of concentrate Part A in liters, B equals the amount of concentrate Part B in liters, and DW equals the amount of distilled water in liters.

* * * * *